(12) United States Patent
Samii et al.

(10) Patent No.: US 11,539,797 B2
(45) Date of Patent: Dec. 27, 2022

(54) RECONFIGURABLE ZONE-BASED ARCHITECTURE FOR TRAILERING APPLICATIONS

(71) Applicant: GM GLOBAL TECHNOLOGY OPERATIONS LLC, Detroit, MI (US)

(72) Inventors: Soheil Samii, Royal Oak, MI (US); Mohammad Naserian, Windsor (CA); Massimo Osella, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 17/158,588

(22) Filed: Jan. 26, 2021

(65) Prior Publication Data
US 2022/0239744 A1  Jul. 28, 2022

(51) Int. Cl.
*H04L 67/12* (2022.01)
*H04L 12/64* (2006.01)
*B60D 1/62* (2006.01)

(52) U.S. Cl.
CPC ............... *H04L 67/12* (2013.01); *B60D 1/62* (2013.01); *H04L 12/6418* (2013.01); *H04L 2012/6454* (2013.01)

(58) Field of Classification Search
CPC ............... H04L 67/12; H04L 12/6418; H04L 2012/6454; B60D 1/62
See application file for complete search history.

(56) References Cited

U.S. PATENT DOCUMENTS

| 11,318,883 | B1* | 5/2022 | Kulkarni | B60Q 1/34 |
| 2018/0229786 | A1 | 8/2018 | Weaver et al. | |
| 2019/0359196 | A1* | 11/2019 | Engelbert | B60T 17/22 |
| 2020/0244478 | A1* | 7/2020 | Dieckmann | G06F 13/4022 |

FOREIGN PATENT DOCUMENTS

CA          2714800 A1     5/2011

* cited by examiner

*Primary Examiner* — Charles C Jiang
*Assistant Examiner* — Shawn D Miller
(74) *Attorney, Agent, or Firm* — Lorenz & Kopf, LLP

(57) ABSTRACT

Methods and systems are provided for communicating trailer information from a trailer to a vehicle. In one embodiment, the method includes: a plurality of zone-based modules configured to communicate with at least one of sensors and actuators of a vehicle; and at least one command center module configured to communicate with the plurality of zone-based modules. The at least one of the plurality of zone-based modules includes a configuration sub-module configured to, by a processor, facilitate communication of the trailer information from the trailer to at least one other of the plurality of zone-based modules. Each of the plurality of zone-based modules includes a configuration sub-module configured to, by a processor, facilitate communication of the trailer information between the plurality of zone-based modules. The at least one command center module includes a configuration sub-module configured to, by a processor, facilitate communication of the trailer information between the plurality of zone-based modules and vehicle applications.

18 Claims, 4 Drawing Sheets

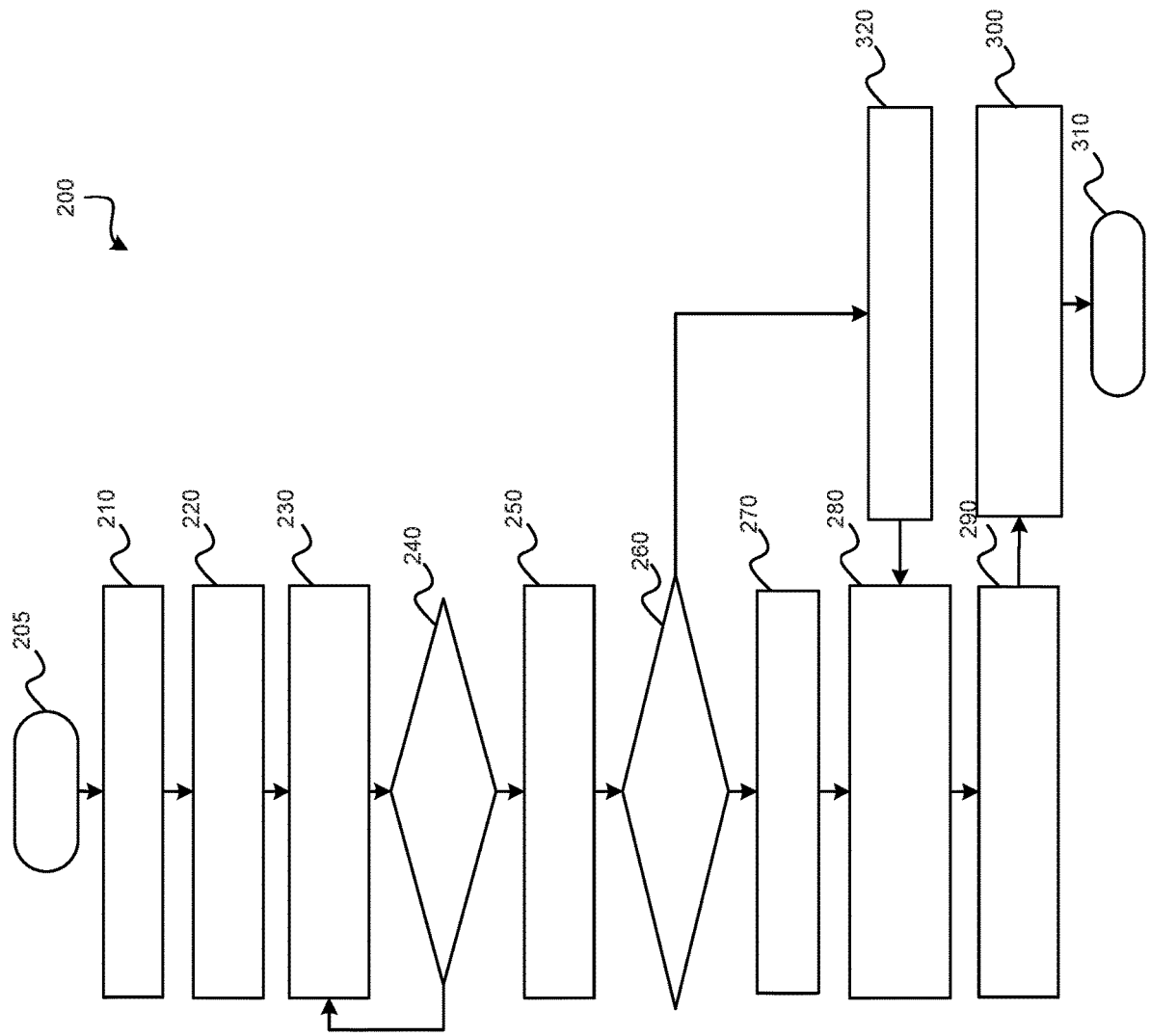

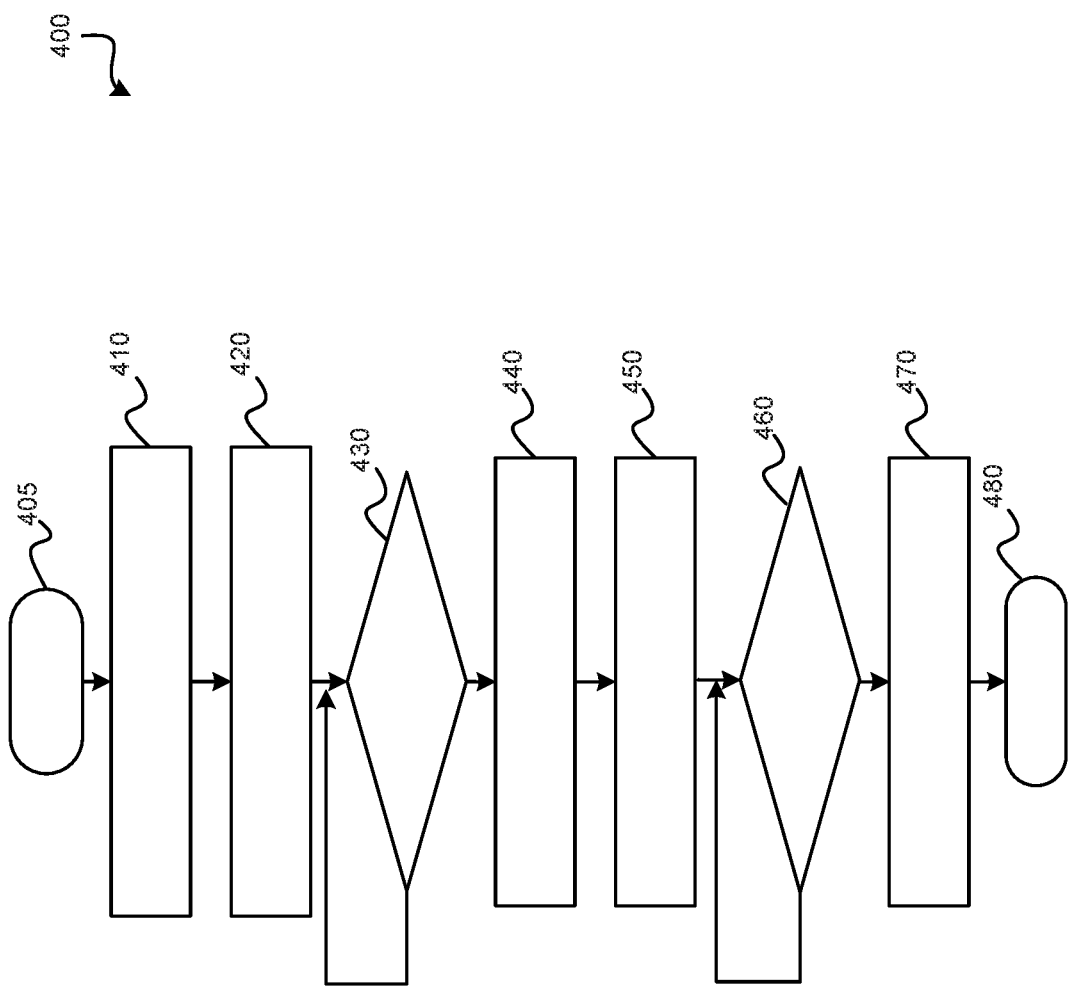

RECONFIGURABLE ZONE-BASED ARCHITECTURE FOR TRAILERING APPLICATIONS

INTRODUCTION

The present disclosure relates generally to methods and systems for accessing input/output devices of trailer applications. More specifically, aspects of the present disclosure relate to systems, methods and devices for providing a reconfigurable zone-based network architecture for accessing input/output devices of trailer applications.

Information from input devices and/or output devices of trailer applications need to be shared with vehicle on-board applications. Without a trailer connected to the vehicle, the vehicle network is statically defined. That is, the zone controllers already know what messages to send and where to send the messages on the network. When a trailer is detected, the network must be dynamically adapted to incorporate the new trailer messages. The trailer messages and trailer I/O devices are typically unknown to the vehicle at the time connection. Trailer messages and trailer I/O devices can vary depending upon the type of trailer connected to the vehicle. Accordingly, it is desirable to provides systems and methods for dynamically adapting the vehicle network architecture when a trailer is connected to the vehicle. Furthermore, other desirable features and characteristics of the present invention will become apparent from the subsequent detailed description and the appended claims, taken in conjunction with the accompanying drawings and the foregoing technical field and background.

SUMMARY

Disclosed herein are vehicle control methods and systems and related control logic for provisioning vehicle systems, methods for making and methods for operating such systems, and motor vehicles equipped with onboard control systems. By way of example, and not limitation, there is presented various embodiments of systems for communicating trailer information from a trailer to a vehicle includes: a plurality of zone-based modules configured to communicate with at least one of sensors and actuators of a vehicle; and at least one command center module configured to communicate with the plurality of zone-based modules; wherein at least one of the plurality of zone-based modules includes a configuration sub-module configured to, by a processor, facilitate communication of the trailer information from the trailer to at least one other of the plurality of zone-based modules, wherein each of the plurality of zone-based modules includes a configuration sub-module configured to, by a processor, facilitate communication of the trailer information between the plurality of zone-based modules, and wherein the at least one command center module includes a configuration sub-module configured to, by a processor, facilitate communication of the trailer information between the plurality of zone-based modules and vehicle applications.

In various embodiments, the system includes a plurality of communication links configured between the plurality of zone-based modules, wherein the plurality of communication links are Ethernet links. In various embodiments, the system includes at least one communication link configured between at least one of the plurality of zone-based modules and the command center module, wherein the at least one communication link is an Ethernet link.

In various embodiments, the system includes at least one communication link configured between the trailer and at least one of the plurality of zone-based modules, wherein the at least one communication link is an Ethernet link.

In various embodiments, the at least one command center module is configured to communicate trailer information to the vehicle applications and receive subscription information from the vehicle applications, wherein the subscription information includes trailer signals that the vehicle application wants to subscribe to.

In various embodiments, the at least one command center module is configured to communicate the subscription information to the plurality of zone-based modules.

In various embodiments, the plurality of zone-based modules are configured to pack the subscription information into multicast frames and communicate the multicast frames via at least one trailer path port. In various embodiments, the plurality of zone-based modules are configured to store subscription information, port assignment information, and a trailer identifier in a table for reconfiguration of the system when the trailer is reconnected.

In various embodiments, the trailer information includes a set of sensor signals generated by sensors of the trailer.

In various embodiments, the system includes a plurality of zone-based modules configured to communicate with at least one of sensors and actuators of a trailer and further configured to communicate with at least one of the plurality of zone-based modules.

In another embodiment, a method for communicating trailer information from a trailer to a vehicle includes: receiving, by a first zone-based module of a plurality of zone-based modules, trailer information from the trailer; configurating, by the first zone-based module, a first communication port between the first zone-based module and an other zone-based modules of the plurality of zone-based modules based on the trailer information; configuring, by the first zone-based module, a second communication port between the first zone-based module and a command center module based on the trailer information; communicating, by the first zone-based module, the trailer information from the trailer to at least one other zone-based module of the plurality of zone-based modules via the first communication port; communicating, by the first zone-based module, the trailer information from the trailer to the command center module via the second communication port; and coordinating, by the command center module, communication of the trailer information between the first zone-based module and vehicle applications of the command center module.

In various embodiments, the communicating the trailer information to at least one other zone-based module is based on an Ethernet communication link.

In various embodiments, the communicating the trailer information to command center module is based on an Ethernet communication link.

In various embodiments, the receiving the trailer information is based on an Ethernet communication link.

In various embodiments, the method includes communicating, by the command center module, the trailer information to the vehicle applications, and receiving subscription information from the vehicle applications, wherein the subscription information includes trailer signals that the vehicle application wants to subscribe to.

In various embodiments, the method includes communicating, by the command center module, the subscription information to the at least one zone-based module of the plurality of zone-based modules.

In various embodiments, the method includes packing, by the at least one zone-based module, the subscription information into multicast frames and communicating the multicast frames via the first communication port.

In various embodiments, the method includes storing, by the at least one zone-based module, the subscription information, port assignment information, and a trailer identifier in a table for reconfiguration when the trailer is reconnected.

In various embodiments, the trailer information includes a set of sensor signals generated by sensors of the trailer.

In various embodiments, the method includes communicating, by at least one zone-based module of a plurality of zone-based modules of the trailer, with at least one of the sensors and actuators of the trailer and communicating, by the at least one zone-based module of the plurality of zone-based modules of the trailer, the set of sensor signals generated by the sensors of the trailer.

BRIEF DESCRIPTION OF THE DRAWINGS

The exemplary embodiments will hereinafter be described in conjunction with the following drawing figures, wherein like numerals denote like elements, and wherein:

FIGS. 4 and 5 are flowcharts illustrating reconfigurable architecture methods that may be performed by the reconfigurable architecture system in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
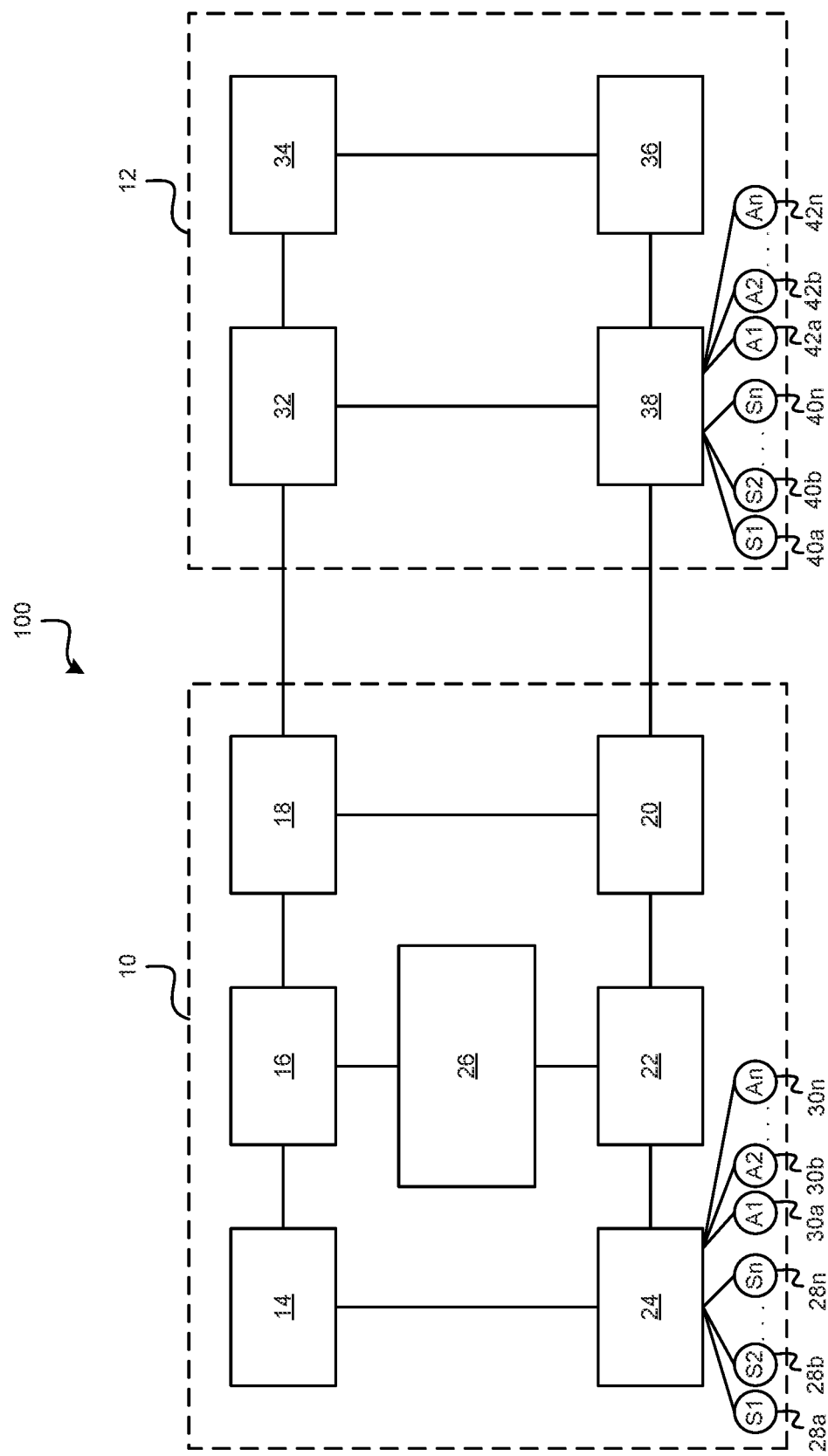
FIG. 1 is an illustration of an exemplary application for the reconfigurable architecture systems and methods in accordance with various embodiments.

Turning now to FIG. 1, an exemplary vehicle 10 equipped to connect to a trailer 12 of various types having various trailer configurations is shown in accordance with various embodiments. The exemplary vehicle 10 is shown to include a reconfigurable architecture system 100 in accordance with various embodiments. The reconfigurable architecture system 100 provides for reconfiguration of a vehicle network in order to allow access of input/output devices of the trailer 12 to vehicle applications of the vehicle 10 and/or access of input/output devices of the vehicle 10 to trailer applications of the trailer 12. The reconfigurable architecture system 100 implements a distributed agreement and protocol to propagate trailer information (such as sensor signals) within the architecture and to reconfigure itself based on subscription events. The new trailer information can be leveraged by existing vehicle applications (e.g., brake control, active safety applications, autonomous driving applications, service/diagnostics applications, etc.) and/or to create new vehicle applications. The vehicle 10 is described herein as an automobile, such as a truck, a sport utility vehicle, a sedan, or other automobile type configured to tow a trailer. As can be appreciated, the vehicle 10 is not limited to an automobile and can be another vehicle type configured to tow a trailer such as, but not limited to, a semi-truck, an off road vehicle, a construction vehicle, a farming vehicle, etc.

In various embodiments, the reconfigurable architecture system 100 includes one or more zone-based modules 14-24 communicatively coupled to a command center module 26. Each of the zone-based modules 14-24 are associated with a zone or location of the vehicle 10 and are configured to communicate with sensors 28a-28n and/or actuators 30a-30n associated with the respective zone of the vehicle 10. For example, in various embodiments the zone-based modules 14-24 include a right front zone module 14, a right middle zone module 16, a right rear zone module 18, a left rear zone module 20, a right middle zone module 22, and a left front zone module 24 which are associated with a respective right front portion of the vehicle 10, a right middle portion of the vehicle, a right rear portion of the vehicle, a left rear portion of the vehicle, a left middle portion of the vehicle, and a left front portion of the vehicle. As can be appreciated, more or less zone-based modules 14-24 can be implemented on the vehicle 10, in various embodiments.

In various embodiments, the zone-based modules 14-24 are communicatively coupled to each other and/or the command center module 26 via standard wired or wireless communication links such as, for example, Ethernet links. In various embodiments, the zone-based modules 14-24 are communicatively coupled to the trailer 12 via standard wired or wireless communication links, such as, for example, Ethernet links.

In various embodiments, the reconfigurable architecture system 100 is implemented on the trailer 12 (as shown). In such embodiments, the reconfigurable architecture system 100 includes zone-based modules 32-38 that are associated with a zone or location of the trailer 12 and are configured to communicate with sensors 40a-40n and/or actuators 42a-42n associated with the respective zone of the trailer 12. In such embodiments, the reconfigurable architecture system 100 includes a right front zone module 32, a right rear zone module 34, a left rear zone module 36, and a left front zone module 38 which are associated with a respective right front portion of the trailer, a right rear portion of the trailer 12, a left rear portion of the trailer 12, and a left front portion of the trailer 12. As can be appreciated, more or less zone-based modules 32-38 can be implemented on the trailer 12, in various embodiments. In various embodiments, the zone-based modules 32-38 are communicatively coupled to each other via standard wired or wireless communication links such as, for example, Ethernet links.

Figure 2:
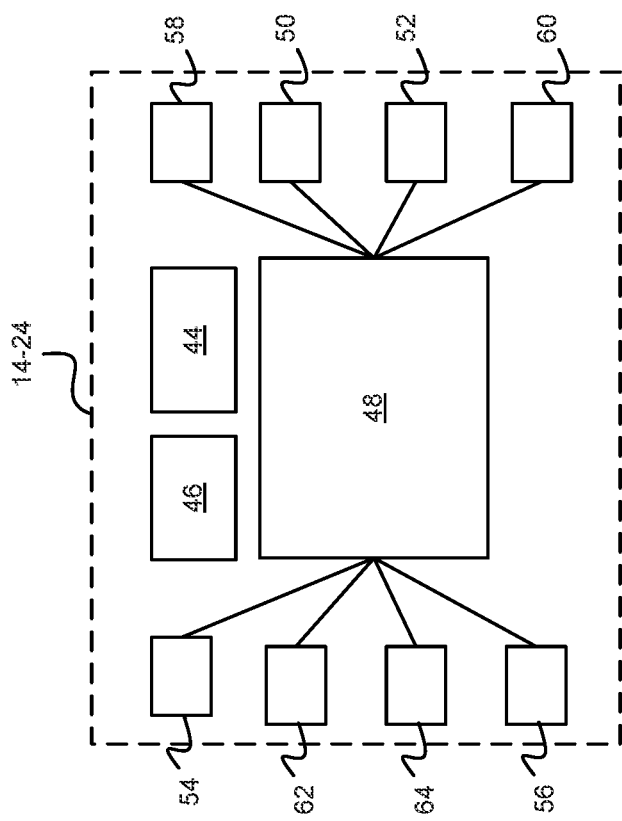

With reference now to FIG. 2, a functional block diagram illustrates the zone-based modules 14-24 in more detail, in accordance with various embodiments. As shown, the zone-based modules 14-24 include at least one processor 44 and a computer readable storage device or media 46. The processor 44 can be any custom made or commercially available processor, a central processing unit (CPU), a graphics processing unit (GPU), an auxiliary processor among several processors associated with the zone-based modules 14-24, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the zone-based modules 14-24 in controlling the vehicle 10.

The instructions may include one or more separate programs, each of which comprises an ordered listing of executable instructions for implementing logical functions. The instructions, when executed by the processor 44, receive and process signals from the sensors 28a-28n, perform logic, calculations, methods and/or algorithms for controlling the components of the vehicle 10, and generate control signals to the actuators 30a-30n to control the components of the vehicle 10 based on the logic, calculations, methods, and/or algorithms. As will be discussed in more detail below, one or more instructions of the zone-based modules 14-24 are embodied in the reconfigurable architecture system 100.

For example, each of the zone-based modules 14-24 further include a configuration sub-module 48 communicatively coupled to one or more vehicle ports (VP) 50-56, one or more trailer ports (TP) 58-60, and one or more trailer path ports (TPP) 62-64. The configuration sub-module 48 is configured to facilitate the communication of trailer information and vehicle information between the zone-based modules 14-24 of the vehicle 10 through the various ports 50-64 (VP, TP, TPP). For example, the vehicle path ports 50-56 are configured to communicate vehicle information to other zone-based modules 14-24 and/or vehicle components 28, 30. The trailer ports 58-60 are configured to communicate trailer information to and from the trailer 12. The trailer path ports 62-64 are configured to communicate trailer information to other zone-based modules 14-24 and/or the command center module 26.

For example, as shown in FIG. 4 and with continued reference to FIG. 2, a flowchart illustrates an exemplary method 200 for reconfiguring a vehicle architecture to facilitate the communication of trailer information and that may be performed by the configuration sub-module 48, in accordance with various embodiments. As can be appreciated in light of the disclosure, the order of operation within the method 200 is not limited to the sequential execution as illustrated in FIG. 4 but may be performed in one or more varying orders as applicable and in accordance with the present disclosure. As can further be appreciated, the method 200 of FIG. 4 may be scheduled to run at predetermined time intervals during operation of the vehicle 10 and/or may be scheduled to run based on predetermined events.

In one example, the method 200 may begin at 205. The configuration sub-module 48 receives a set of trailer signals (TS1) at 210 and forwards the set of trailer signals (TS1) to other zone-based modules 14-24 via one or more of the trailer path ports (TPP) 62-64 at 220. Thereafter, the configuration sub-module 48 forwards the set of trailer signals (TS1) to the command center module 26 at 230 and waits for a response from the command center module 26 indicating trailer signals subscribed to by the vehicle applications at 240. When the configuration sub-module 48 receives the set of subscribed trailer signals (STS1) at 240, the configuration sub-module 48 packages and forwards the set of subscribed trailer signals (STS1) onto other zone-based modules 14-24 via one or more of the trailer path ports (TPP) 62-64 or the trailer port (TP) at 250-290.

For example, the configuration sub-module 48 identifies the trailer signals subscribed to at 250 and determines whether the zone-based module 14-24 in which it resides is the trailer interface for any of the trailer signals (TS1) subscribed to at 260. When the zone-based module 14-24 is the trailer interface for the trailer signal (TS1), the configuration sub-module 48 performs a lookup of PDU packing table and packs the set of subscribed trailer signals (STS1) into multicast frames at 270. The configuration sub-module 48 then adds the multicast frames to local forwarding table and assigns forwarding ports to the trailer path ports (TPP) at 280. The configuration sub-module 48 then computes the bandwidth consumed by the STS signals as, for example, the payload times the frequency and configures the Ethernet switch to monitor a maximum bandwidth on trailering ingress port at 290. The configuration sub-module 48 forwards information to other zone-based modules on the TPP ports and begins normal operation at 300. Thereafter, the method may end at 310.

If, however, the zone-based module 14-24 is not the trailer interface for the trailer signal (TS1), the configuration sub-module 48 receives information on Ethernet frames at 320 and adds the information the local forwarding table and assigns forwarding ports to the trailer path ports (TPP) at 280. The configuration sub-module 48 then computes the bandwidth consumed by the STS signals as, for example, the payload times the frequency and configures the Ethernet switch to monitor a maximum bandwidth on trailering ingress port at 290. The configuration sub-module 48 forwards information to other zone-based modules on the TPP ports and begins normal operation at 300. Thereafter, the method may end at 310.

Figure 3:
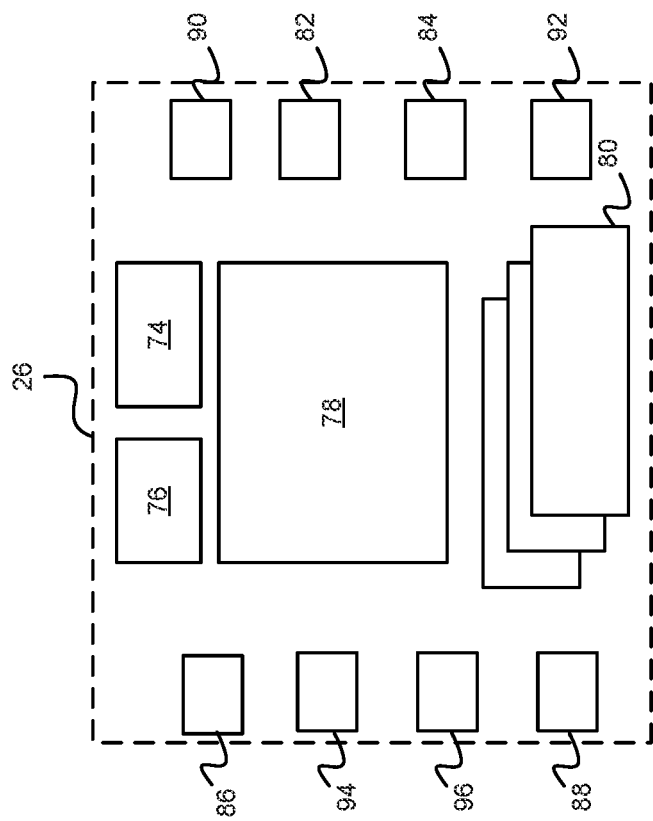
FIGS. 2 and 3 are functional block diagrams illustrating the reconfigurable architecture system in accordance with various embodiments.

With reference now to FIG. 3, a functional block diagram illustrates the command center module 26 in more detail, in accordance with various embodiments. As shown, the command center module 26 include at least one processor 74 and a computer readable storage device or media 76. The processor 74 can be any custom made or commercially available processor, a central processing unit (CPU), a graphics processing unit (GPU), an auxiliary processor among several processors associated with the command center module 26, a semiconductor based microprocessor (in the form of a microchip or chip set), a macroprocessor, any combination thereof, or generally any device for executing instructions. The computer readable storage device or media 76 may include volatile and nonvolatile storage in read-only memory (ROM), random-access memory (RAM), and keep-alive memory (KAM), for example. KAM is a persistent or non-volatile memory that may be used to store various operating variables while the processor 74 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by command center module 26 in controlling the vehicle 10.

The instructions may include one or more separate programs, each of which comprises an ordered listing of executable instructions for implementing logical functions. The instructions, when executed by the processor 74, receive and process signals from the zone-based modules 14-24, perform logic, calculations, methods and/or algorithms for controlling the components of the vehicle 10, and generate control signals to zone-based modules 14-24 to control the components of the vehicle 10 based on the logic, calculations, methods, and/or algorithms. As will be discussed in more detail below, one or more instructions of the command center module 26 are embodied in the reconfigurable architecture system 100.

For example, command center module 26 further include a configuration sub-module 78 communicatively coupled to one or more vehicle ports (VP) 82-88, one or more and one or more trailer path ports (TPP) 90-96. The command center module 26 is configured to facilitate the communication of trailer information and vehicle information between the zone-based modules 14-24 and the vehicle applications 80. For example, the vehicle path ports 82-88 are configured to communicate vehicle information to other zone-based modules 14-24. The trailer path ports 92-96 are configured to communicate trailer information to other zone-based modules 14-24.

For example, as shown in FIG. 5 and with continued reference to FIG. 3, a flowchart illustrates an exemplary method 400 for reconfiguring a vehicle architecture to facilitate the communication of trailer information and that may be performed by the configuration sub-module 78, in accordance with various embodiments. As can be appreciated in light of the disclosure, the order of operation within the method 400 is not limited to the sequential execution as illustrated in FIG. 5 but may be performed in one or more varying orders as applicable and in accordance with the present disclosure. As can further be appreciated, the method 400 of FIG. 5 may be scheduled to run at predetermined time intervals during operation of the vehicle 10 and/or may be scheduled to run based on predetermined events.

In one example, the method 400 may begin at 405. The configuration sub-module 78 receives one or more sets of trailer signals (TS1 and TS2) forwarded on from the zone-based modules 14-24 at 410. The configuration sub-module 78 sends sets of trailer signals to all vehicle applications 80 at 420. Thereafter, the configuration sub-module 78 waits for a response from vehicle applications 80 indicating which if any of the signals the vehicle application 80 will subscribe to at 430. The configuration sub-module 78 assigns a subscription subset (STS1) to signals from the one or more sets of signals for which at least one vehicle application 80 wishes to subscribe at 440. The configuration sub-module 78 then sends the subset (STS1) to the zone-based modules 14-24 at 450.

In response, once the configuration sub-module 78 receives the multicast information and PDU packing list from the zone-based modules 14-24 at 460, the configuration sub-module 78 then reconfigures the Ethernet Socket Adaptor to process multicast frames according to the multicast information and PDU content that has been received at 470. Thereafter, the method may end at 480.

As can be appreciated, once the trailer 12 has been connected to the vehicle 10 and the architecture has been configured, the zone-based modules 14-24 and the command center module 26 may store the configuration information for future use. For example, the information may be stored based on an identifier associated with the trailer 12. The information may be used to reconfigure the architecture (for example from a default configuration) any time the trailer 12 is reconnected to the vehicle 10 and the identifier is recognized.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for communicating trailer information from a trailer to a vehicle, the system comprising:
    a plurality of zone-based modules configured to communicate with at least one of sensors and actuators of a vehicle; and
    at least one command center module configured to communicate with the plurality of zone-based modules;
    wherein at least one of the plurality of zone-based modules includes a configuration sub-module configured to, by a processor, facilitate communication of the trailer information from the trailer to at least one other of the plurality of zone-based modules,
    wherein each of the plurality of zone-based modules includes a configuration sub-module configured to, by a processor, facilitate communication of the trailer information between the plurality of zone-based modules,
    wherein each of the plurality of zone-based modules are configured to store subscription information, port assignment information, and a trailer identifier in a table for configuration of the system, wherein the subscription information includes trailer signals that a vehicle application wants to subscribe to; and
    wherein the at least one command center module includes a configuration sub-module configured to, by a processor, facilitate communication of the trailer information between the plurality of zone-based modules and vehicle applications.

2. The system of claim 1, further comprising a plurality of communication links configured between the plurality of zone-based modules, wherein the plurality of communication links are Ethernet links.

3. The system of claim 2, further comprising at least one communication link configured between at least one of the plurality of zone-based modules and the command center module, wherein the at least one communication link is an Ethernet link.

4. The system of claim 1, further comprising at least one communication link configured between the trailer and at least one of the plurality of zone-based modules, wherein the at least one communication link is an Ethernet link.

5. The system of claim 1, wherein the at least one command center module is configured to communicate trailer information to the vehicle applications and receive the subscription information from the vehicle applications.

6. The system of claim 5, wherein the at least one command center module is configured to communicate the subscription information to the plurality of zone-based modules.

7. A system for communicating trailer information from a trailer to a vehicle, the system comprising:
    a plurality of zone-based modules configured to communicate with at least one of sensors and actuators of a vehicle; and at least one command center module configured to communicate with the plurality of zone-based modules;

wherein at least one of the plurality of zone-based modules includes a configuration sub-module configured to, by a processor, facilitate communication of the trailer information from the trailer to at least one other of the plurality of zone-based modules, wherein each of the plurality of zone-based modules includes a configuration sub-module configured to, by a processor, facilitate communication of the trailer information between the plurality of zone-based modules, wherein the plurality of zone-based modules are configured to pack subscription information into multicast frames and communicate the multicast frames via at least one trailer path port, wherein the subscription information includes trailer signals that a vehicle application wants to subscribe to; and wherein the at least one command center module includes a configuration sub-module configured to, by a processor, facilitate communication of the trailer information between the plurality of zone-based modules and vehicle applications.

8. The system of claim 1, wherein the trailer information includes a set of sensor signals generated by sensors of the trailer.

9. The system of claim 1, further comprising a plurality of zone-based modules configured to communicate with at least one of sensors and actuators of a trailer and further configured to communicate with at least one of the plurality of zone-based modules.

10. A method for communicating trailer information from a trailer to a vehicle, the method comprising:

receiving, by a first zone-based module of a plurality of zone-based modules, trailer information from the trailer;

configurating, by the first zone-based module, a first communication port between the first zone-based module and an other zone-based modules of the plurality of zone-based modules based on the trailer information;

configuring, by the first zone-based module, a second communication port between the first zone-based module and a command center module based on the trailer information;

communicating, by the first zone-based module, the trailer information from the trailer to at least one other zone-based module of the plurality of zone-based modules via the first communication port;

communicating, by the first zone-based module, the trailer information from the trailer to the command center module via the second communication port coordinating, by the command center module, communication of the trailer information between the first zone-based module and vehicle applications of the command center module; and packing, by the first zone-based module, subscription information into multicast frames and communicating the multicast frames via the first communication port, wherein the subscription information includes trailer signals that a vehicle application wants to subscribe to.

11. The method of claim 10, wherein the communicating the trailer information to at least one other zone-based module is based on an Ethernet communication link.

12. The method of claim 11, wherein the communicating the trailer information to command center module is based on an Ethernet communication link.

13. The method of claim 10, wherein the receiving the trailer information is based on an Ethernet communication link.

14. The method of claim 10, further comprising communicating, by the command center module, the trailer information to the vehicle applications, and receiving the subscription information from the vehicle applications.

15. The method of claim 14, further comprising, communicating, by the command center module, the subscription information to the at least one zone-based module of the plurality of zone-based modules.

16. The method of claim 15, further comprising storing, by the at least one zone-based module, the subscription information, port assignment information, and a trailer identifier in a table for reconfiguration when the trailer is reconnected.

17. The method of claim 10, wherein the trailer information includes a set of sensor signals generated by sensors of the trailer.

18. The method of claim 17, further comprising communicating, by at least one zone-based module of a plurality of zone-based modules of the trailer, with at least one of the sensors and actuators of the trailer and communicating, by the at least one zone-based module of the plurality of zone-based modules of the trailer, the set of sensor signals generated by the sensors of the trailer.

* * * * *